US009633582B2

(12) United States Patent
Widener et al.

(10) Patent No.: US 9,633,582 B2
(45) Date of Patent: Apr. 25, 2017

(54) LABEL DEVICE

(71) Applicant: Multi Packaging Solutions, Inc., Lansing, MI (US)

(72) Inventors: John R. Widener, Haslett, MI (US); Kristi Huffman, Grand Rapids, MI (US)

(73) Assignee: Multi Packaging Solutions, Inc., Lansing, MI (US)

( * ) Notice: Subject to any disclaimer, the term of this patent is extended or adjusted under 35 U.S.C. 154(b) by 32 days.

(21) Appl. No.: 14/826,441

(22) Filed: Aug. 14, 2015

(65) Prior Publication Data

US 2016/0046116 A1 Feb. 18, 2016

Related U.S. Application Data

(60) Provisional application No. 62/037,639, filed on Aug. 15, 2014.

(51) Int. Cl.

| | |
|---|---|
| ***B32B 7/04*** | (2006.01) |
| ***B32B 7/08*** | (2006.01) |
| ***B32B 37/00*** | (2006.01) |
| ***B32B 38/04*** | (2006.01) |
| ***B32B 38/10*** | (2006.01) |
| ***B32B 38/14*** | (2006.01) |
| ***B29C 65/56*** | (2006.01) |
| ***G09F 7/18*** | (2006.01) |
| ***G09F 3/12*** | (2006.01) |
| ***G09F 3/20*** | (2006.01) |

(52) U.S. Cl.

CPC .................. *G09F 7/18* (2013.01); *G09F 3/12* (2013.01); *G09F 3/20* (2013.01); *G09F 3/204* (2013.01); *G09F 2007/1834* (2013.01); *G09F 2007/1843* (2013.01); *G09F 2007/1856* (2013.01)

(58) Field of Classification Search

USPC ...................................... 156/91, 92, 249, 277

See application file for complete search history.

(56) References Cited

U.S. PATENT DOCUMENTS 4,794,221 A 12/1988 Takabe et al.
6,178,681 B1 * 1/2001 Caloia ........................ G09F 3/08 174/66
2005/0010499 A1 * 1/2005 Farkas ................. G06Q 10/087 705/28

FOREIGN PATENT DOCUMENTS

CA 2395598 A1 8/2001
CA 2421337 10/2003
CA 2560246 A1 10/2005

OTHER PUBLICATIONS

Machine translation of CN 202003606 (Nov. 8, 2016).*
English Abstract of CN 202006606 (Nov. 8, 2016).*
Canadian Office Action dated Jun. 1, 2016; Application No. 2,900,476.

* cited by examiner

*Primary Examiner* — Sing P Chan

(74) *Attorney, Agent, or Firm* — The Dobrusin Law Firm, PC

(57) ABSTRACT

An improved advertising and labeling method comprising forming a substantially planar label, die-cutting a plurality of openings in at least two opposing locations on the label, such that the openings are configured to align with a plurality of openings on a display device and locating a fastening device within at least one of the plurality of openings.

20 Claims, 4 Drawing Sheets

LABEL DEVICE

FIELD OF THE INVENTION

The present invention relates generally to labels and signage that can be easily and quickly customized and modified.

BACKGROUND OF THE INVENTION

In the retail sector and elsewhere there is an ongoing and growing need for easily modified advertising and labeling systems that can be securely fastened to a wide range of display units. Generally, signage and labeling on mobile storage and display devices is provided separate from the display so that modification of the goods located onto the display can be easily coordinated with removal of any label. However, such modular labels become easily separated from the goods which they are intended to advertise and also require additional time and effort to move the labels should the display require a change in location as is frequently the case in retail outlets.

Notwithstanding the above, there remains a need for improved advertising and labeling systems that allow for secure attachment to displays, especially displays that may be moved from a first location to a second location and displays where the goods located onto the displays are often modified.

SUMMARY OF THE INVENTION

The present invention addresses one or more of the above needs by providing a method comprising forming a substantially planar label, die-cutting a plurality of openings in at least two opposing locations on the label, such that the openings are configured to align with a plurality of openings on a display device and locating a fastening device within at least one of the plurality of openings.

The method may also include locating the fastening device through a corresponding opening on a display device. The method may include die-cutting four or more openings on the label. The label may be substantially rectangular in shape and at least two openings may be located near at least two terminating edges of the label. The display device may be a stacked shelf set. The display device may be a stacked shelf set having at least three shelves and each shelf may include a label attached thereto.

The method may include locating a fastening device within all of the plurality of openings and may also include locating a fastening device within all of the plurality of openings and all corresponding openings on the display device. The fastening device may be a tree-fastener. The method may include die-cutting the plurality of openings such that a first terminating end of the label includes exactly two openings and a second terminating end which opposes the first terminating end, includes exactly two openings. The method may include die-cutting a centralized opening. The centralized opening may be equidistant from at least two terminating edges of the label. The method may include die-cutting exactly five openings and each of the five openings may receive a fastening device. The label may be located onto a shelf and may have a width that is substantially equal to the width of the shelf. The label may have a length that is at least about ten times the width of the label. At least two labels may be attached to at least two shelves of the display device. The method may include printing onto at least one side of the label.

The label and methods described herein offer any of a number of benefits and advantages. The label provides an easily modifiable advertising system wherein the label itself can be securely fastened to a display device and still moved as needed.

DETAILED DESCRIPTION

The present teachings meet one or more of the above needs by the improved composite structures and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of filing date of U.S. Provisional Application No. 62/037,639, filed Aug. 15, 2014. The entirety of the contents of that application are hereby incorporated by reference for all purposes.

In general, the teachings herein provide for a label that includes a plurality of openings. The openings are preferably formed for receiving a fastening device. The label may be removably attached to a display device via one or more of the fastening devices. The display device may include one or more surfaces for receiving the label. The display device may include one or more openings, which openings may be located to correspond with the openings of the label. The fastening devices may be located through the opening in the label and may also be located through openings located on the display device.

Figure 1:
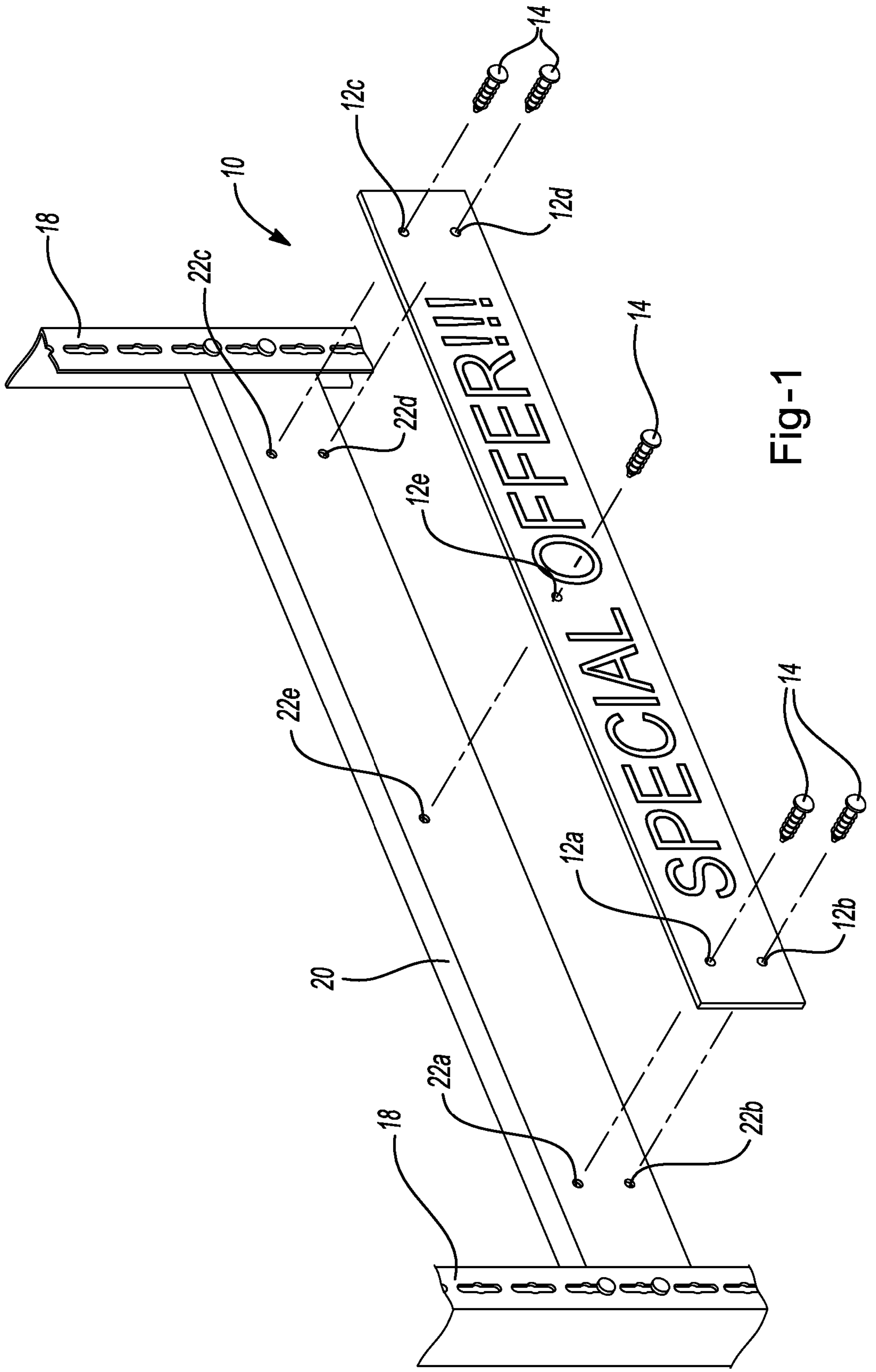
FIG. 1 is top down view of an illustrative label as described herein.

As shown for example in FIG. 1, the label 10 may include a plurality of openings 12*a*-12*e*. A fastening device 14 may be located within the plurality of openings. The label may be affixed to a display device 18. The display device may include a shelf 20, which receives the label. The shelf 20 may also include a plurality of openings 22*a*-22*e* which correspond with the plurality of openings 12*a*-12*e* in the label.

Figure 2:
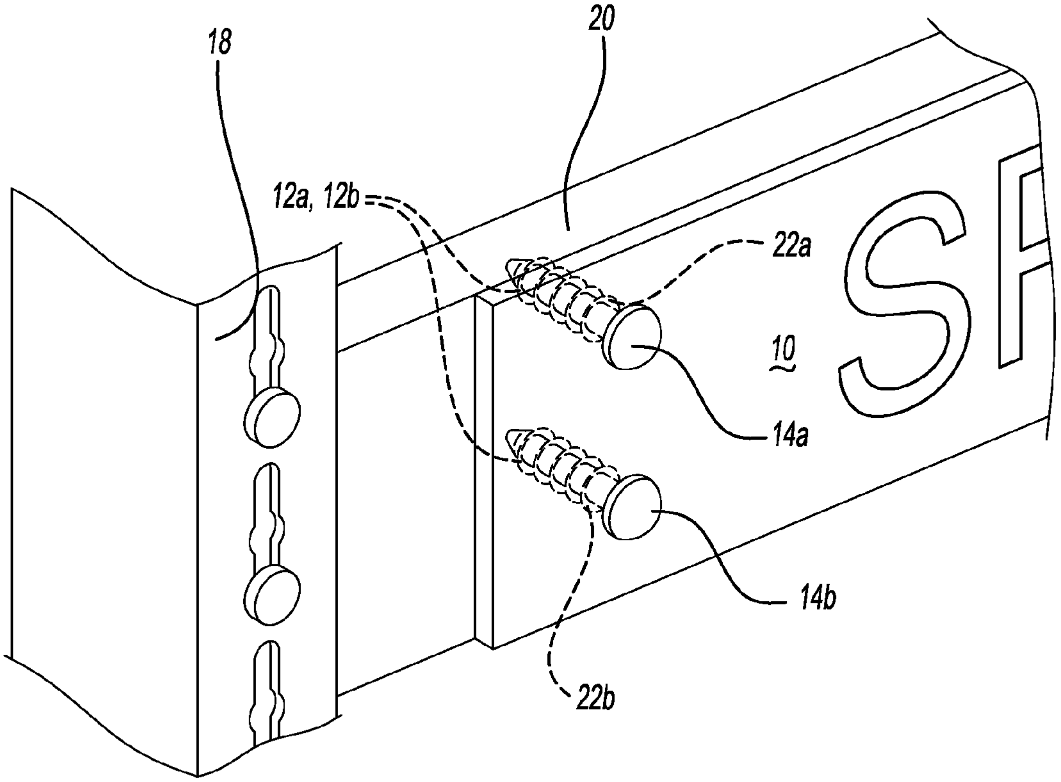
FIG. 2 is a perspective view of an illustrative label as described herein shown attached to a display device.

FIG. 2 shows an example label 10 including a first and second opening 12*a*, 12*b*. A first fastening device 14*a* and a second fastening device 14*b* are located into the openings 12*a*, 12*b*. The label 10 is shown located onto a shelf 20. The shelf 20 includes corresponding openings 22*a*, 22*b* for receiving the fastening devices 14*a* and 14*b*.

Figure 3:
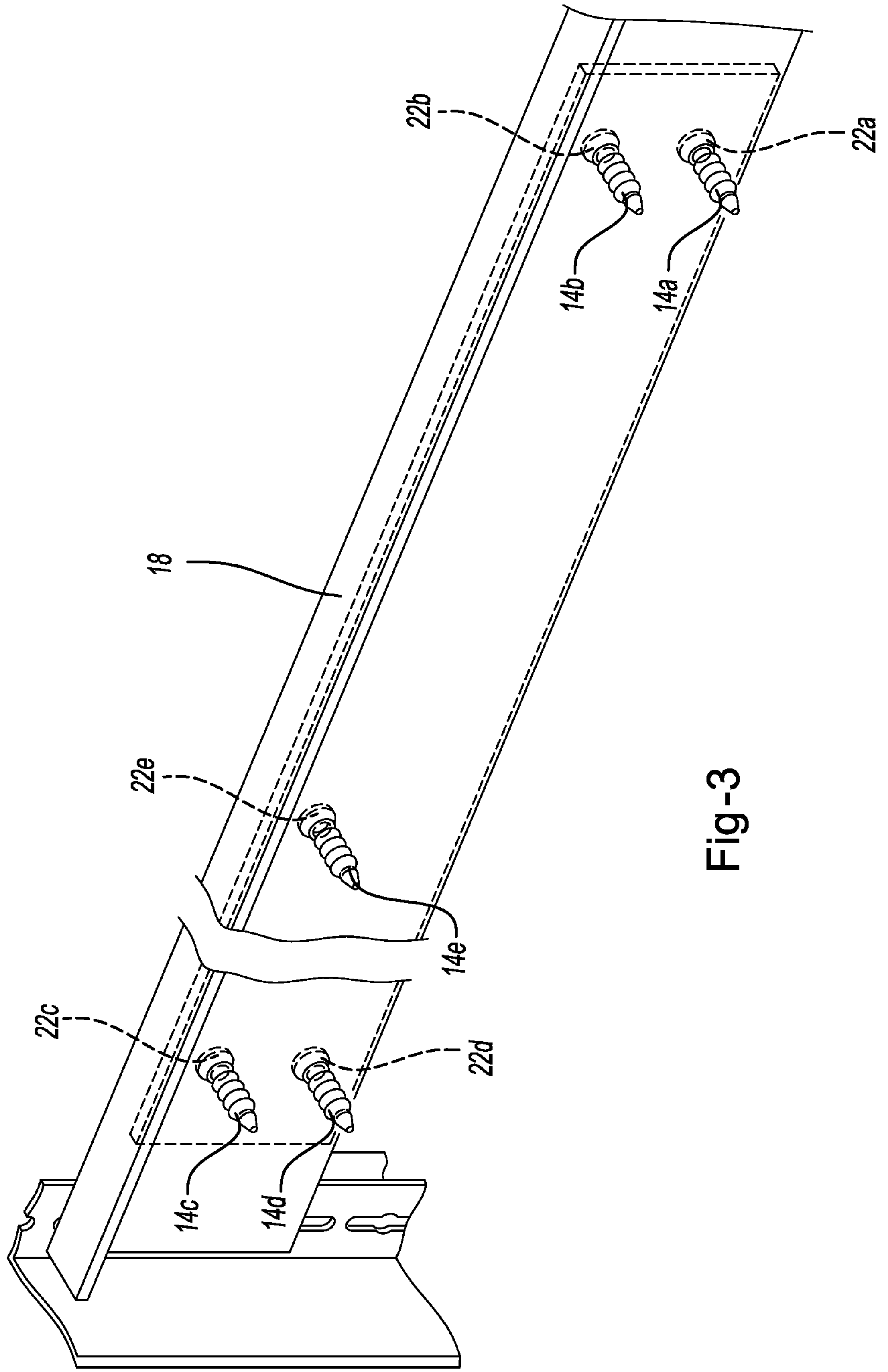
FIG. 3 is a perspective view of illustrative fastening devices shown located within openings of a display device.
Figure 4:
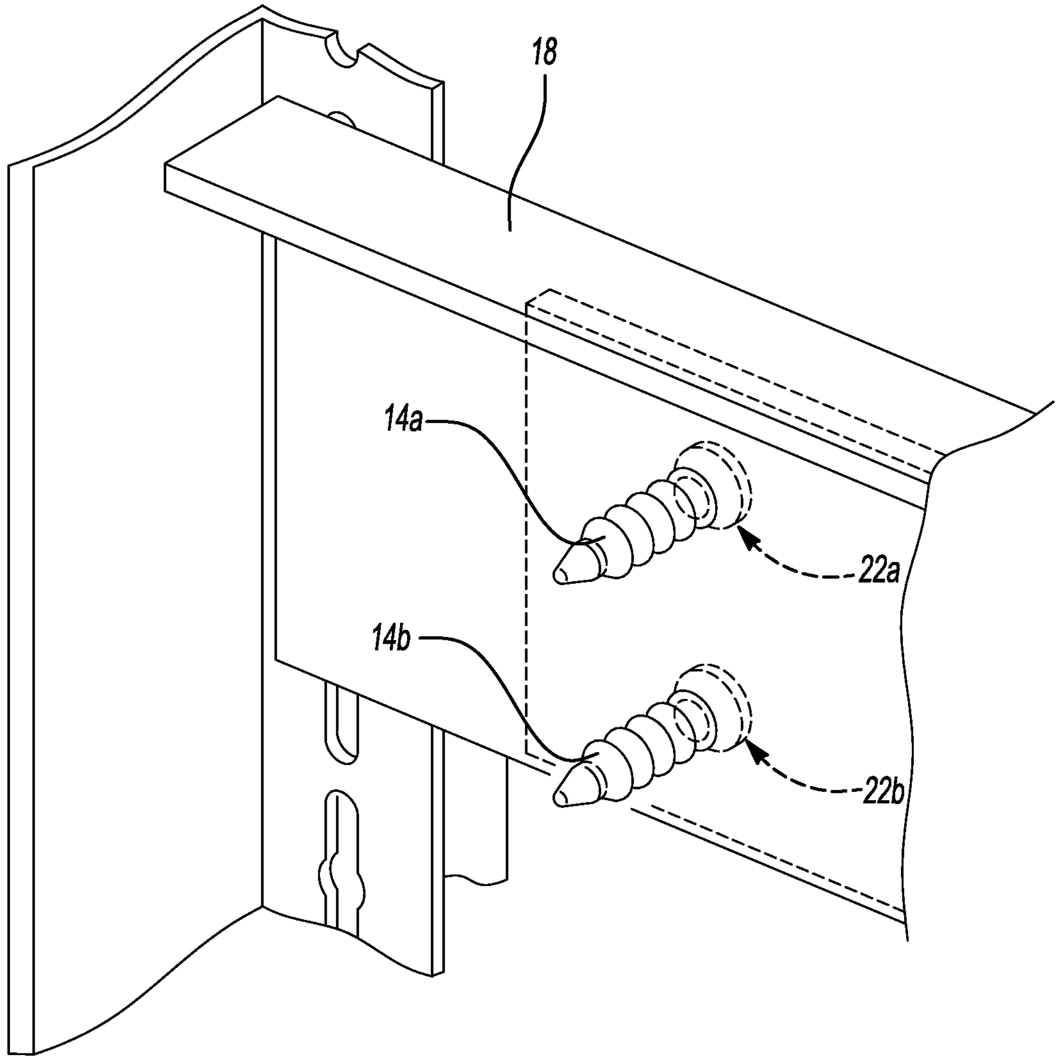
FIG. 4 is an additional perspective view of the fastening devices of FIG. 3.

FIGS. 3 and 4 include views of an exemplary display device 18. FIG. 3 shows fastening devices 14*a*-14*e* located into display device openings 22*a*-22*e*. FIG. 4 shows a close-up view of display device openings 22*a* and 22*b* for receiving fasteners 14*a* and 14*b*.

The label may be substantially planar. The label may include a first surface and an opposing second surface. The label may include at least a portion that is substantially planar. The label may include a top edge, a bottom edge and one or more side edges. The label may include only three edges. The label may include exactly four edges. The label may be circular, having only one edge. The top edge and bottom edge may be substantially parallel. The label may include a pair of substantially parallel side edges. The label may comprise a substantially continuous material layer. Alternatively, the label may include one or more cut-out portions. The label may be formed of a flexible material. The label may be formed of a substantially rigid material. The label may be formed of a flexible material having a coating or additional material layer placed thereon to impart increased rigidity to the label. The label may be contacted with an adhesive layer that may provide increased rigidity to the label material. The label may also be contacted with a handling layer so that the handling layer provides increased rigidity to the label.

The label may include one or more openings and/or cut-out portions. The one or more openings and/or cut-out portions may be formed by removing a portion of the label. The label material may be die-cut to remove a portion of the label, thus creating the opening and/or cut-out portion. The one or more openings and/or cut-out portions may be confined within the edges of the label so that the one or more openings and/or cut-out portions do not contact any edges of the label. The cut-out portion may be formed so that a portion contacts one or more edges of the label so that an opening is created along one or more edges of the label. The openings may include one or more side edges. The openings may include at least two side edges that are substantially parallel to one another. The openings may be substantially circular. The openings may include only one continuous side edge. The side edges of the openings may be substantially parallel to one or more side edges of the label.

The label may be contacted with a fastening device which may be a mechanical fastener and/or an adhesive layer. The fastening device may allow the label to adhere to a surface of a display device. The fastening device may be such that the label can be attached to a first surface, removed from the first surface, and attached to a second surface and/or any number of additional surfaces. The fastening device may be a substantially permanent fastening device so that the label is difficult to remove from a substrate, thus deterring theft of the label.

The label discussed herein may be composed of a pliable material to provide flexibility. A particular feature of the material may be that it is durable enough to resist tearing during attempts to place and remove the label. The label may be formed of paper materials including but not limited to paperboard, chipboard, cardboard, fiberboard, natural fibers, mineral fibers or any combination thereof. The material may be a virgin material, a post-consumer recycled material, or a combination of both. The material may be a recyclable material and/or a biodegradable material. If the label material includes paperboard, the paperboard may be a bleached or unbleached paperboard. For example it may be a solid bleached sulfate (SBS) paperboard. The label may be formed of a more rigid material, such as a polymeric material including but not limited to thermoplastics, thermoset plastics, elastomer containing materials, or any combination thereof. Examples of polymeric materials that may be employed include polyamide, polyester, polystyrene, polyethylene (including polyethylene terephthlate, high density polyethylene and low density polyethylene), polypropylene, polyvinyl chloride, bio-based plastics/biopolymers (e.g., poly lactic acid), silicone, acrylonitrile butadiene styrene (ABS), or any combination thereof. The label may also be composed of a paper-based material that includes a coating, which may be a polymeric coating, to enhance the strength and/or rigidity of the label. The coating may be a film layer. Common plastic films that may be used include nylon, polyvinyl chloride, polypropylene, high-density polyethylene, low-density polyethylene, linear low-density polyethylene, polyvinylidene chloride and combinations thereof.

The label and fasteners may be such that the label can be quickly and easily moved from a first display location to a second display location. The label and fasteners may be such that the label can be quickly and easily moved from a first storage location to a second display location. The label and fasteners may be such that the label can be quickly and easily moved from a first display location to a second storage location. The label and fasteners may be such that the label can be quickly and easily moved from a first storage location to a storage display location. The label may be designed so that it provides product information for display purposes (e.g., in a retail setting for consumer viewing), and may also provide product information for storage purposes (e.g., in a storeroom to identify the contents of a particular shelf or other storage location). The label may be designed to travel with an associated product in order to simplify the movement of a product from one location in a retail setting to a second location in a retail setting. The openings in the label may be customizable according to a display device in a particular retail location, such that the retail location can request openings in specific locations along the label. The label may also be provided with a variety of openings in varying locations, such that the label may be attached to any number of differing display devices so long that at least one opening in the label aligns with at least one opening on a corresponding display device. Accordingly, one label, having a plurality of openings may be located via one or more fasteners onto a first display device, and thereafter moved to a second display device that is different from the first display device. Thus, the openings receiving a fastener on the first display device may differ from those openings that receive a fastener on the second display device.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A method comprising:

receiving a request from a retail location for specific opening locations;

designing a substantially planer label including product information;

forming the substantially planer label;

die-cutting a plurality of openings in the specific opening locations on the label, such that the openings are configured to align with a plurality of openings on a display device; and locating a fastening device within at least one of the plurality of openings.

2. The method of claim 1, including locating the fastening device through a corresponding opening on a display device for removably attaching the label to the display device.

3. The method of claim 2, wherein the display device is a stacked shelf set.

4. The method claim 2, wherein the display device is a stacked shelf set having at least three shelves and each shelf includes a label attached thereto.

5. The method of claim 2, including locating a fastening device within all of the plurality of openings and all corresponding openings on the display device.

6. The method of claim 2, wherein the label is located onto a shelf and has a width that is substantially equal to the width of the shelf.

7. The method of claim 2, wherein at least two labels are attached to at least two shelves of the display device.

8. The method of claim 1, including die-cutting four or more openings on the label.

9. The method of claim 8, wherein the label is substantially rectangular in shape and the specific opening locations are located near at least two terminating edges of the label.

10. The method of claim 9, including locating a fastening device within all of the plurality of openings.

11. The method of claim 10, wherein the fastening device is a tree-fastener.

12. The method of claim 9, including die-cutting a centralized opening wherein the centralized opening is equidistant from at least two terminating edges of the label.

13. The method of claim 1, wherein the label is substantially rectangular in shape and the specific opening locations are located near at least two terminating edges of the label.

14. The method of claim 1, including locating a fastening device within all of the plurality of openings.

15. The method of claim 1, including die-cutting the plurality of openings such that a first terminating end of the label includes exactly two openings and a second terminating end which opposes the first terminating end, includes exactly two openings.

16. The method of claim 1, including die-cutting a centralized opening.

17. The method of claim 1, including die-cutting exactly five openings.

18. The method of claim 17, wherein each of the five openings receives a fastening device.

19. The method of claim 1, wherein the label has a length that is at least about ten times the width of the label.

20. A method comprising:

designing a substantially planer label including product information;

forming the substantially planer label;

receiving a request from a retail location for specific opening locations;

die-cutting a plurality of openings in the specific opening locations on the label, such that the openings are configured to align with a plurality of openings on a shelf of a display device; and locating a fastening device within at least one of the plurality of openings on the shelf.

* * * * *